US 8,686,077 B2
Apr. 1, 2014

(12) United States Patent
Berg

(54) MOLDING COMPOSITION WITH REDUCED COEFFICIENT OF FRICTION AND IMPROVED RELEASE PROPERTIES

(75) Inventor: Daniel Berg, Elm Grove, WI (US)

(73) Assignee: Trillium Specialties LLC, Whitewater, WI (US)

( * ) Notice: Subject to any disclaimer, the term of this patent is extended or adjusted under 35 U.S.C. 154(b) by 206 days.

This patent is subject to a terminal disclaimer.

(21) Appl. No.: 13/051,160

(22) Filed: Mar. 18, 2011

(65) Prior Publication Data

US 2011/0166274 A1  Jul. 7, 2011

Related U.S. Application Data

(63) Continuation of application No. 12/271,108, filed on Nov. 14, 2008, now Pat. No. 7,910,646.

(60) Provisional application No. 60/988,530, filed on Nov. 16, 2007.

(51) Int. Cl.
*C08K 5/06* (2006.01)

(52) U.S. Cl.
USPC .......................................... 524/376; 524/377

(58) Field of Classification Search
USPC ................................................. 524/376, 377
See application file for complete search history.

(56) References Cited

U.S. PATENT DOCUMENTS

| 4,302,506 | A | 11/1981 | Heberger |
| 4,327,009 | A | 4/1982 | Allen et al. |
| 4,908,063 | A | 3/1990 | Baker et al. |
| 5,849,209 | A | 12/1998 | Kindt-Larsen et al. |
| 5,883,166 | A | 3/1999 | Jennings et al. |
| 6,784,235 | B2 | 8/2004 | Gupta et al. |
| 7,037,964 | B2 | 5/2006 | Gupta et al. |
| 7,910,646 | B1 * | 3/2011 | Berg .............................. 524/376 |

* cited by examiner

*Primary Examiner* — Edward Cain
(74) *Attorney, Agent, or Firm* — Boyle Fredrickson, S.C.

(57) ABSTRACT

This invention relates to a composition and method of modifying the surface of a polymeric to produce a film or article with a reduced coefficient of friction (COF) and improved release properties. The reduced coefficient of friction improves both the slip and anti-blocking properties of the material as well aiding in processing of the polymeric material. Additionally, the invention improves demolding and release of the polymeric material from other polymeric surfaces or adhesives as well as metal molding surfaces.

14 Claims, No Drawings

MOLDING COMPOSITION WITH REDUCED COEFFICIENT OF FRICTION AND IMPROVED RELEASE PROPERTIES

CROSS-REFERENCE TO RELATED APPLICATIONS

This application claims priority as a continuation of U.S. Non-Provisional application Ser. No. 12/271,108, filed Nov. 14, 2008, now U.S. Pat. No. 7,910,646, which claims priority under 35 U.S.C. §119(e) to U.S. Provisional Application Ser. No. 60/988,530, filed Nov. 16, 2007, the entirety of which are each expressly incorporated by reference herein.

FIELD OF THE INVENTION

This invention relates to a polymeric composition and method of modifying the surface of the polymeric composition to produce a film or article with a reduced coefficient of friction (COF) and improved release properties. The reduced coefficient of friction improves both the slip and anti-blocking properties of the material as well aiding in processing of the polymeric material. Additionally, the invention improves demolding and release of the polymeric material from other polymeric surfaces or adhesives as well as metal molding surfaces.

BACKGROUND OF THE INVENTION

It is often desirable to modify the surface interface of polymeric materials to produce a variety of related surface effects such improved slip or lubricity, reduced blocking, and to lubricate process equipment. It is also desirable to modify polymeric surfaces to improve release of adhesives and promote demolding or adhesion of other materials from a polymeric composition surface. It is also generally understood in the art that improved slip and reduced blocking are a function of reduced coefficient of friction (COF) for the particular composition. A variety of prior art additives and modifiers have been developed to attempt to provide these attributes to different types of polymeric materials. These additions and modifiers can be classified as anti-block additives, slip aids, COF modifiers and release aids, and have somewhat related but different purposes and attributes, as described below.

1. Anti-Block Additives

Polyolefin resins are regularly used to produce sheets and films. These sheets and films are stacked or rolled in storage and use. The sheets or rolls of film can adhere to each other and become very difficult to separate due to surface tackiness and other molecular binding mechanisms. This phenomenon is called blocking. Anti-blocking agents are commonly and interchangeably called slip aids. Anti-blocking agents are commonly added to the melt phase of the resins during compounding or extrusion to mitigate this blocking effect.

The most common approach to reducing blocking behavior is the use of certain particulates as additives that are dispersed in the resin. These anti-blocking additives take various forms such as Zeolite, inorganic silicates, silica or powdered silicone rubber. However, these dispersed solids can produce a strong haze effect and can produce unattractive films. Further, like other proposed solutions, this solution for blocking of these films can create problems with regard to reducing the COF of the film. For example, a polypropylene film is often laminated to other films. In particular, glassine paper is commonly laminated to polypropylene film. Such a laminate, when provided as a thin surface layer containing finely divided inorganic material, exhibits significantly higher COF values than does the unlaminated polypropylene film as a result of the particulate additive present in the polypropylene film. Such laminates are known to perform marginally at best on conventional form, fill and seal machines.

Another prior art attempt to reduce blocking is disclosed in U.S. Pat. No. 4,327,009 which describes the use of polyglycols and other low molecular weight additives to polyolefin films to reduce blocking. These additives are selected due to their propensity to migrate to the surface, and as such suffer from the limitations created by the migrating additives. The migration behavior of these or any other type of additive to a polymeric compound is a function of the solubility parameter of the additive in relation to that of the base polymer and the molecular weight of the additive. The more mismatched the solubility parameters and the lower the molecular weight, the faster the additive can migrate to the interface of the polymer and cause undesirable effects thereon, such as an increase of COF.

2. Slip Aid Additives

Slip aids also reduce blocking but further aid in lubricating handling and converting equipment down stream from extrusion or molding. Injection molded parts also benefit from slip aids when the slip aids are incorporated within the material formed into the parts as the parts have improved lubricity against each other when handled. This reduces marring and enables the material/parts to flow better when handled in bulk.

The lubricity effects discussed herein are to be distinguished from the industry term "internal lubricant" which is an additive class of materials that effectively "plasticizes" the polymer melt to improve processing and flow.

Many slip agents based on silicones and fatty amides, such as erucamide and oleamide, are well known in the art. Although they do reduce the coefficient of friction, lubricate and improve release, their effectiveness depends upon their ability to migrate to the surface of the film, which is required for these slip aids to be effective. In addition, the development of the desired level of anti-block or slip for the film composition in which the slip aids are utilized is strongly dependent upon the type slip aid used, the amount used, the storage time of the film and storage temperature. The heat history of the film while in storage, shipping and during subsequent converter processes also significantly affects the surface lubricity effect and is thus difficult to predict and control. In addition, the presence of fatty acid amides used as a slip aid that migrates onto the exterior of the film surface, while decreasing the COF of the film, unfortunately results in visible adverse appearance effects for the film, manifested by an increase in haze, a decrease in gloss and the presence of streaks. These fatty amide slip aid materials also adversely affect the adhesion of solvent and water-based inks, coatings and adhesives.

The migration of silicones utilized as slip aids can also cause similar downstream processing problems as the amides. Recent advances in silicone additive technology have been made to reduce the migration rates of the silicones and siloxanes. However, these modifications made to the silicone slip aids often cause the silicone slip aids to suffer from incompatibility with the resins which makes compounding very difficult. As a result, consistent compounding of these silicone materials is recognized in the industry as being very difficult to achieve. Commercial offerings of these materials can also still migrate to a small extent and continue to cause downstream issues due to this migration.

3. COF Modifiers

Polypropylene films have found wide acceptance in the packaging industry, especially as a food packaging agent, because of their superior physical properties. Polypropylene film, usually biaxially oriented, is characterized by high tensile modulus and stiffness, and excellent optical clarity and a certain degree of moisture resistance. Moreover, polypropylene film is highly pervious to gases and air. However, polypropylene possesses one major disadvantageous property, namely, a high inherent coefficient of friction (COF). This high COF significantly complicates the processing of the polypropylene film. In particular, the polypropylene film processing is impeded by poor transport, caused by its high COF, over rollers, guides and the like. In addition, the high COF creates film storage problems. In particular, because of its high COF one layer of polypropylene film sticks to those above and beneath it, creating the blocking effect referenced earlier.

This serious disadvantage of polypropylene film is well known to those skilled in the art. Thus, many proposed solutions to overcome this major deficiency have been proposed in the art. One such proposal has been to incorporate additives in the polypropylene resin processed to form the film. A favorite additive utilized for COF reduction are slip aids, specifically fatty acid amides. These amides decrease the COF of the polypropylene film as they migrate to the film surface after heat treatment and aging. Although this method has been used, actual COF is a function of the heat history to which the film has been exposed during shipping, storage and processing. As such, it is subject to wide variation. More significantly, the presence of fatty acid amides on the film surface oftentimes adversely affects the appearance of the film as manifested by decreased gloss and the presence of streaks, as discussed previously.

Another serious disadvantage of using fatty acid amides is the detrimental effect that the fatty acid amide additives have on polypropylene film surface wetability and adhesion when the additive has migrated onto the surface of the film to provide the COF reduction. This adverse adhesion characteristic caused by the additives applies to coating, inks, adhesives and the like, especially in water based forms that are applied to the surface of the films.

It is also known to coat polypropylene films with certain fatty acid amides to impart lubricating and anti-blocking characteristics, as opposed to incorporating the amines within the film as an additive. However, the application of such coatings by the film manufacturer is not particularly attractive because of the added equipment and corresponding expense of doing so, as well as the requirement that the amine coatings be applied as solutions in organic solvents. Health and safety factors dictate against the in-plant utilization of organic solvents in coating processes undertaken during the film manufacture.

Other slip additives have been suggested for use with thermoplastic films to overcome the inherent problem of high COF in thermoplastic films. One such solution, as disclosed by U.S. Pat. No. 4,302,506, is the use of a latex coating containing stearamidopropyl-dimethyl-beta-hydroxyethylammonium nitrate and a crosslinkable acrylic copolymer. However, this method requires post treatment of the film or article by applying the additive as a coating to the surface of the polymeric film. While avoiding the problems caused by having to utilize organic solutions in applying the coating, this alternative additive is still undesirable because it requires downstream coating and curing equipment, and the additional expense associated with them.

4. Internal Mold Release and Adhesive Release Aids

It is also desirable to incorporate internal mold release aids into thermoplastics and thermoset resin compositions because these release aids assist in demolding extruded or cured parts formed from the thermoplastic or thermoset resins from production molds and processing equipment. For example, U.S. Pat. No. 5,883,166 describes the use of a liquid mold release agent for unsaturated polyester resins. However, in general, liquids are not commercially feasible for use as release aids due to their low molecular weight which allows the additive to migrate out of the compound too quickly, subsequently causing a variety of problems with the molded product in commercial use, such as those described previously.

The above discussion reflects the need in the art for improved additives for polypropylene and other polyolefin films that are capable of creating films characterized by improved anti-blocking characteristics and decreased COF. The same desired effects provided by additives of this type should also extend to other polymeric materials, such as the materials utilized to form the molds in which products are formed from these polyolefin films, which could potentially be made from a polyolefin of other suitable compound including additives of this type, to improve the release of the product from the mold when a product formed from a polymeric material is molded or cured within or in proximity to the mold.

In addition, when providing these attributes, it is desirable to have an additive material that has minimal or no migration within the polymeric compound, such that the additive is considered essentially permanent, to avoid the problems associated with the migration of prior art additive onto the surface of the polymeric film or item. In addition to the non-migratory properties of the additive, it is incumbent that the particular additive or compound utilized for the improvement in film slip property also not correspond or create to any decline in any other properties of the film in which the additive is utilized, which is typical of the previous additive solutions advanced in the prior art.

SUMMARY OF THE INVENTION

According to one aspect of the present invention, the present invention provides a method of producing a polymeric composition unexpectedly having reduced COF, and thus improved slip, reduced blocking, improved release and enhanced demolding capability by introducing an additive into the polymeric composition that is formed of a high molecular weight, high melting point ethoxylated compound, and the composition formed with the additive. The high melting point of the additive enables the additive to be stable at elevated temperatures when used in various polymeric films, and the high molecular weight of the additive causes the additive to be essentially non-migratory within the polymeric compound. Thus, the resultant polymeric composition formed with the additive of this invention also unexpectedly demonstrate no detrimental effects on the beneficial properties of the polymeric film as opposed to that seen as a result of the use of other prior art additives, including wetability and adhesion of paints, inks and coatings to the film that are caused by the migration of the prior art additives within the films.

According to another aspect of the present invention, it has been unexpectedly discovered that the class of materials disclosed within as inventive for use as the polymeric composition additives also allows for the release of adhesives from polymeric films formed utilizing the additives. This discovery allows the direct extrusion of ready-to-use films incorporating the additive that can be utilized as a release liner without the requirement of coating and curing of a separate release coating onto these films. These liners can be used in a variety of applications such as tape backing, pressure sensitive label liner, linerless labels, release separator sheets, shingle release tapes and other traditional release liner applications. In this application, subsequent adhesion is important and the greatly reduced or eliminated migration of the additive is critical to the beneficial performance of the films incorporating the additive as a release liner.

The primary material class that has unexpectedly been discovered as capable of being utilized for these purposes as the additive is a non-migratory, high melting point, high molecular weight ethoxylated compound. Though low melting point, low molecular weight, migratory ethoxylated compounds have been disclosed for other uses in the prior art, this class of compounds has not been previously disclosed for use as a COF modifier, slip aid, release aid, and/or anti-blocking additive for polymeric compositions.

More specifically, for example, U.S. Pat. No. 5,849,209 (the '209 patent) describes the use of low melting point, low molecular weight ethoxylated amine additives as wetting agents compounded into the thermoplastic mold material used in the molding process of contact lenses. However, the additive materials disclosed in these references are amine compounds, and, as described previously, thus are migratory within the polymeric materials into which they are added in order to provide the improved wetability of the mold materials, as opposed to the non-migratory, high melting point, high molecular weight additives of the present invention. In addition, these references disclose only that the particular migratory ethoxylated amine additives improve wetability by minimizing the surface tension of the mold materials, without any disclosure or suggestion of the use of non-migratory ethoxylated additives as an additive for reducing the COF of a polymeric film, or to improve the demolding properties of the mold or of the materials being formed in the molds.

Further, U.S. Pat. No. 4,327,009 (the '009 patent), which is incorporated by reference herein in its entirety, discloses the use of liquid ethoxylated compounds as anti-block, non-slip additives for olefin polymers. However, the '009 patent specifically states the importance of the use of low molecular weight ethoxylated materials for the particular slip and blocking performance provided to the olefinic films. In particular, the '009 patent teaches that low molecular weight liquid ethoxyalted additives are required for adequate slip and block performance because of the need for the additives to migrate to the surface of the olefinic polymer to provide the desired benefits. This teaching is directly opposite to the discovery of this invention that utilizes very high melting point, high molecular weight additives for improved control of migration of the additive within the polymeric compound, and improved melt processability.

Additionally, U.S. Pat. Nos. 7,037,964 (the '964 patent) and 6,784,235 (the '235 patent) describe the use low molecular weight alcohol ethoxylates as an anti-fogging melt additive for polyolefin to produce anti-fogging films. The '964 and '235 patents explicitly state that in the embodiments where the ethoxylated additives are compounded into the polymeric materials utilized to form the films, the anti-fogging additive will migrate out of, or exude to the surface of the film in order for the ethoxylated anti-fogging agent to be effective. Again, this migration of the additive is exactly opposite to the additive and composition of the present invention, but is consistent with the prior art teachings that additives of this type need to migrate to the surface of the films to be effective. Further, no disclosure of the applicability of the low molecular weight ethoxylated compounds disclosed in these patents to reduce blocking, or as a mold release agent is found in these patents, as the only mention of any component having these properties is in the discussion of other additive that can be added to the film composition in addition to the anti-fogging additive.

Additionally, U.S. Pat. No. 4,908,063 (the '063 patent) discloses an additive composition for waterbased inks utilizing alcohol ethoxylates which, among other benefits, claims reduced coefficient of friction for the ink composition. However, the '063 patent is exclusively directed towards ink compositions including water and the additive, such that there is no discussion or suggestion in the reference that proposes the use of the additive as a melt additive for thermoplastics or other polymeric compositions for the reduction of the coefficient of friction and/or improving release or slip properties as for the additive and composition of the present invention.

As a result, the high melting point, high molecular weight, non-migratory ethoxylated compound utilized as the coefficient of friction reducing and/or release or slip aid additive of the present invention, and the polymeric compounds formed utilizing the additive provide significant and unexpected benefits to the numerous types of items that can be formed using the polymers modified by these additives.

Numerous other aspects, objects and advantages of the present invention will be made apparent from the following detailed description, taken together with the drawing figures.

DETAILED DESCRIPTION OF THE INVENTION

The composition of the invention is a thermoplastic polymer, a thermoset resin or other polymer-based composition containing at least one melt processable ethoxyalted additive that is essentially non-migratory, that reduces the COF of the resultant compound, and also improves the demolding properties and adhesive behavior of the compound.

Thermoplastic polymers that can be utilized in this composition are primarily polypropylene and polyethylene. Not to be limited to but suggested by reference, other engineering resins such as nylon, polyetheretherketone (PEEK), ethylene vinyl acetate (EVA), styrenics, styrene acrylonitrile (SAN), polyester terephthalate (PET) as well as thermoplastic elastomers, TPUs and TPVs can also be utilized in this composition. No limitation is anticipated in the selection of thermoplastic, thermoset or polymeric resins which can be useful in the manufacture of compositions according to in this invention.

The composition of this invention may also contain one or more additional additives commonly known in the art without interference with the performance of the additive of this invention. However, the presence of metal stearates or similar polar bonding materials is known in the art to have antagonistic effects on other surface active ingredients. These interfering additives compete for interfacial sites and can reduce efficacy, and therefore are not included within the compositions of the present invention.

Potential Applications

One important application for this inventive composition is in films produced by the blown film process, extruded films or co-extruded films. Some specific potential applications of such films are films to be used for release liners, films for packaging, films for agricultural or greenhouse use, co-extruded films and graphics films.

However, injection molded parts and profile extrusions can also benefit from reduced surface friction and release properties provided by the additive and composition of the present invention when used to form the parts. In addition, blow molded parts can benefit from the surface lubricity imported by the inventive composition when used to form the parts. Bottles and other parts formed in this manner with the composition and additive of the present invention are easier to handle in bulk and can pack more efficiently in totes and boxes. Less marring of the film form with the composition and additive of the present invention occurs with the reduction of the COF. Bottle caps and other closures and also easier to remove and operate with the improved surface lubricity provided by the composition and additive of the present invention.

It is also anticipated that this inventive composition is utilizable in rotomolding applications to assist in demolding, whether by improving the release properties of the mold or of the product being formed within the mold. Also, thermoset applications requiring heated mixing or curing are excellent candidates for the inventive additives disclosed here. The temperature during processing must be sufficient to liquefy the additive and disperse it throughout the compound. If this is performed the surface properties and release behavior will be improved.

In accordance with the present invention, a thermoplastic or thermoset resin is compounded with at least one ethoxylated compound having the following general structure:

$$R-(CH_2CH_2O)_xH$$

The ethoxylated compound is melt processable and has only limited or no migration ability at end use temperatures, T<150° F., for example. The inventive materials are solid at these temperatures, as they have melting points of between 70° C. and 110° C., and more preferably between 85° C. and 95° C., and thus have little or no migration when compounded into a polymeric system. The ethoxylate can have from 1 to 100 ethylene oxide units. The number of ethoxylate units is very influential on its orientation at the interfaces and subsequently its performance. Further, the molecular weight of the ethoxylated chain preferably falls between 100 amu and 4500 amu, with a range of 115 amu to 1900 amu being especially preferred. The weight percent of the ethoxylated chain in the overall weight of the additive can be from about 20% w/w to about 90% w/w.

The structure and molecular weight of the R group that has been ethoxylated is also very important to the performance of the additive. The R group must either be of sufficient molecular weight to make it a solid or wax at post processing use temperatures, i.e., at least 300 amu, or preferably between abut 350 amu and about 700 amu, with a range of between about 400 amu to about 500 amu being especially preferred. The R group can also have other structural elements that significantly retard migration of the molecule after processing. The R group structure must also allow for the additive to be melt processable or at least melt at compounding and production temperatures. The R group may be but not limited to linear alcohols, branched alcohols, carbohydrates, cyclic containing alkyls, alkyl esters, phosphate esters, polymeric alcohols, and the like. Individual constituents on the R group do not change the inventive nature of the additive, except for enhancing the ability of the additive to be non-migratory within the polymer based upon the size of the R group.

The currently preferred embodiment of the invention is a polymer or resin combined with 0.05 to 30 parts or percent by weight, and more preferably 1.0 to 10.0 parts or percent by weight of at least one COF reducing compound of the formula:

$$CH_3CH_2(CH_2CH_2)_aCH_2CH_2(OCH_2CH_2)_bOH$$

where a is >9 and b is 1 to 100 as an additive in the polymer or resin. In one preferred embodiment, the compound can have the above formula where a is greater than 25. In another preferred embodiment, the compound can have the above formula where b is between 10 and 100, and more preferably between 40 and 75.

In further accordance with the present invention, a thermoplastic resin or compound including the COF reducing additive may be made into a film by cast extrusion or by being blown, it may be extruded into a profile or injection or blow molded into an article or used to form a mold in which item formed of other various polymeric materials are formed. In still further accordance with the present invention the thermoplastic composition including the additive can optionally contain other performance additives such as antioxidants, pigments, fillers, additional lubricants, impact modifiers and other additives traditional incorporated into thermoplastic compositions for performance.

EXAMPLES

The following examples are provided for reference and are not intended to limit the application of the inventive composition.

The following list provides some preferred embodiments of the inventive additives of the present invention in comparison with prior art silicone additives which were tested to determine the differences in the performance characteristics of the polymers and resins admixed with these additives.

Ethoxylate A is a compound with the formula $CH_3CH_2(CH_2CH_2)_aCH_2CH_2(OCH_2CH_2)_bOH$, where a has an average number between 14 and 15 and b has an average between 2 and 3.

Ethoxylate B is a compound with the formula $CH_3CH_2(CH_2CH_2)_aCH_2CH_2(OCH_2CH_2)_bOH$, where a has an average number between 14 and 15 and b has an average between 10 and 11.

Ethoxylate C is a compound with the formula $CH_3CH_2(CH_2CH_2)_aCH_2CH_2(OCH_2CH_2)_bOH$, where a has an average number between 14 and 15 and b has an average between 40 and 45.

For comparison Silicone A is Trilwax Si 900 a commercially available alkyl-modified siloxane used in high temperature release and lubricant applications available from Trillium Specialties.

For comparison Silicone B is commercially available ultra high molecular weight silicone additive (Genioplast P) produced by Wacker Chemie and is known in the art as a process aid and surface lubricant.

For comparison Silicone C is a semi-commercial silicone compound produced for use as a melt additive to produce release effects on film consisting of ultra-high molecular weight dimethyl siloxane gum and an intermolecular bonding agent.

These compounded materials were produced by mixing the selected additives with a 0.65 MI/0.904 Density Homo-polymer Polypropylene using a Haake Torque Rheometer with 20:1 L/D Bradender twin screw counter rotating extruder with 4 temperature segments at an RM ranging from 30 to 50 and a temperature profile of between 375 and 475.

Films were produced using a 25:1 L/D Brabender single screw with a blown film die. The extruded blown film was collected on a vertical blown film tower. During extrusion the torque values were measured at 30 rpm to observe any process aid attributes resulting from the increased lubricity. The results in Table 1 show that the inventive compounds process as well as those silicones normally utilized as a process aid.

TABLE 1

| | % Additive | Additive | Torque |
|---|---|---|---|
| 1 | 0.0% | Control | 30.00 |
| 2 | 5.0% | Silicone B | 12.00 |
| 3 | 2.5% | Ethoxylate B | 14.50 |
| 4 | 2.5% | Ethoxylate A | 9.00 |
| 5 | 2.0% | Silicone A | 9.60 |

Static coefficient of friction measurements were performed film on film with an increasing angle arm device. The test specimens approximately 1"×4" are attached to the aluminum lever arm and a 150 g steel block with a face dimension of 1'×2". The arm raises until the block begins to move. The angle of the arm is measured when the blocks slides and in converted to COF by the calculating the tangent of the angle. The dynamic surface tension was directly measured. However, visual observations were made on the amount of pressure required to keep the "slide" of the block going. Most materials are tacky and have a start/stop behavior, suggesting low dynamical COF while materials that have a smooth slide with low pressure generally have a low dynamic surface tension. The results are disclosed in Table 2 and demonstrate that the ethoxylate additives of this invention can reduce the COF as much or more than commercial silicones used for this purpose.

TABLE 2

| | % Additive | Additive | COF |
|---|---|---|---|
| 1 | 0.0% | Control | 0.42 |
| 2 | 5.0% | Silicone B | 0.34 |
| 3 | 2.5% | Ethoxylate B | 0.36 |
| 4 | 2.5% | Ethoxylate A | 0.18 |
| 5 | 2.0% | Silicone A | 0.34 |

Demolding was evaluated by placing compounded pellets of the polymer and respective additives into aluminum mold dishes and heated for 2 hours at 210° C. so the pellets melted and coalesced. The molds were cooled to room temperature and the molded puck was removed from the mold. The difficulty of removal was given a scale from 1 to 10 where 1 is given when the puck falls out of the mold with no force and 10 being fused to the mold and destruction of the puck would be necessary. The scale in between is the approximate force required to separate the puck from the mold. The clarity of the puck was observed as well. The control material in highly translucent and that was given a 1 rating and 2 indicates an significant increase in haze and 3 is opaque. These results are provided in Table 3.

It can be seen that the use of the ethoxylates have a dramatic impact on demolding over the control. The results also show that the ethoxylates do not dramatically hurt the haze as much as other demolding additives. Most surprising is the performance compared to Silicone A and B which are expected to produce excellent demolding results. It is also observed in trials 3 and 4 that the ethoxylates can be synergistic when used in conjunction with other additives. Trials 7 and 8 demonstrate a concentration dependence. It is anticipated that each individual application and compound will have a specific optimum concentration of additive.

TABLE 3

| | Release Additive | Adhesion Rating | Clarity Rating |
|---|---|---|---|
| 1 | Control | 9.5 | 1 |
| 2 | 2.5% Ethoxylate A | 3 | 2 |
| 3 | 2% Ethoxylate A + 3% Silicone A | 2 | 1 |
| 4 | 5% Silicone A | 3.5 | 1 |
| 5 | 10% Silicone B | 2 | 3 |
| 6 | 2.5% Ethoxylate C | 2 | 1 |
| 7 | 5% Ethoxylate B | 2.5 | 2 |
| 8 | 2.5% Ethoxylate B | 1 | 1 |

Adhesive properties or release was measured by testing the blown films produced under TLMI 180 peel test procedures using TESA tape 7475 pulled at 300 inches per minute. The tape laminated samples were conditioned at 140° F. for 20 hours before peeling. For subsequent adhesion, the Finat 11 test procedure was run which applies an unused piece of TESA tape and a piece of tape that has been in touch with the substrate for the 20 hr oven test, as in the peel test. The tapes are allowed to dwell on a clean steel plate for twenty minutes and pulled at 12 inches per minute at a 180 degree angle. The result is divided by the control result to get the % subsequent adhesion.

Table 4 demonstrates that ethoxylates can act as a melt additive release agent to produce ready to use release liner films. The control was welded to the tape and could not be removed. Ethoxylate C showed release comparable to Silicone C which is a melt additive intended to perform the same function. The most surprising observation was the high percentage subsequent adhesion. This suggests that the additive is non-migratory even under harsh heated storage conditions.

TABLE 4

| | % Additive | Additive | 300 ipm Release | % Sub. Adh |
|---|---|---|---|---|
| 1 | 0.0% | Control | Welded | NA |
| 2 | 10.0% | Silicone C | 375.00 | 94 |
| 3 | 2.5% | Ethoxylate C | 487.00 | 100 |

In this example, the kinetic coefficient of friction modification of the invention was demonstrated with a thermoplastic elastomer or plastomer. The polymer Dow Chemical Affinity PL1880G was melt processed in a twin screw extruder with 2.5% of ethoxylate A. The resultant compound was made into a 5 mil film via blown film processing. The films were measured for kinetic coefficient of friction on a Instumentors 3M90 Slip/Peel testing apparatus following ASTM D-1894 specifications as closely as possible, and the results are shown below in Table 5.

TABLE 5

| | Kinetic COF |
|---|---|
| Film with no additive | 0.75 |
| Film with 2.5% Ethoxylate A | 0.56 |

Due to the high level of blocking or tackiness of thermoplastic elastomers it is common for resins to be supplied with anti-block additive present. Further control of COF or more improved anti-block may be desired. In another example, the compatibility with other anti-block agents is demonstrated with a blend of ethoxylates in a plastomer. Using the Dow Affinity 1880G polymer, 3% of 1:1 blend of Ethoxylate A and C were melt processed with 1.25% anti-block additive concentrate 100456 produced by Ampecet, in a twin screw extruder. Subsequently, a 5 mil blown film was produced. Kinetic COF was measured in a process analogous to above, with the results shown below in Table 6.

TABLE 6

| Film With Antiblock | Kinetic COF |
|---|---|
| Film with no COF additive | 0.40 |
| Film with additive blend | 0.23 |

In both cases, substantial drop in kinetic COF is demonstrated. Surprisingly, films produced with the ethoxylated additives did not show any change in visual clarity or haze. The typical tacky surface character of the Affinity resin was eliminated.

Various other alternatives are contemplated is being within the scope of the following claims particularly pointing out and distinctly claiming the subject matter regarded as the invention.

I claim:

1. A polymeric composition having a reduced coefficient of friction for use in forming a film or capable of being utilized in various molding processes, the composition comprising:
   a) a polymer; and
   b) at least one melt-processable ethoxylated compound additive for reducing the coefficient of friction of the composition where the ethoxylated compound is incorporated into the polymer, wherein the at least one additive has the formula:

$CH_3CH_2(CH_2CH_2)_aCH_2CH_2(OCH_2CH_2)_bOH$ wherein a is >9 and wherein b is between 40 and 100.

2. The composition of claim 1 wherein the at least one additive is migration resistant.

3. The composition of claim 1 wherein a is between about 14 and about 15.

4. The composition of claim 1 wherein the at least one additive is a solid at temperatures below 150° F.

5. The composition of claim 1 wherein the at least one additive is present in an amount of between about 0.05 to about 30 parts by weight of the composition.

6. The composition of claim 1 wherein the at least one additive is present in an amount of between about 0.05 to about 10 parts by weight of the composition.

7. The composition of claim 1 wherein the polymer is selected form the group consisting of a thermoplastic polymer and a thermoset polymer.

8. The composition of claim 1 wherein the composition is utilized to form an item selected from the group consisting of: a blow molded item, an extruded item, a co-extruded item, and an injection molded item.

9. A release liner formed from the composition of claim 1.

10. A molded product formed from the composition of claim 1.

11. A mold for use in a molding process formed from the composition of claim 1.

12. A method for molding an item, the method comprising the steps of:
   a) providing the moldable polymeric composition of claim 1; and
   b) processing the composition in a suitable molding operation.

13. The method of claim 12 wherein the molding operation is selected from the group consisting of: a blow molding operation, an injection molding operation, an extrusion operation, and a co-extrusion operation.

14. A polymeric composition having a reduced coefficient of friction for use in forming a film or capable of being utilized in various molding processes, the composition comprising:
   a) a polymer; and
   b) at least one melt-processable ethoxylated compound additive for reducing the coefficient of friction of the composition where the ethoxylated compound is incorporated into the polymer, wherein the at least one additive has the formula:

$CH_3CH_2(CH_2CH_2)_aCH_2CH_2(OCH_2CH_2)_bOH$ wherein a is >9 and wherein b is between 40 and 75.

* * * * *

UNITED STATES PATENT AND TRADEMARK OFFICE
CERTIFICATE OF CORRECTION

PATENT NO. : 8,686,077 B2  
APPLICATION NO. : 13/051160  
DATED : April 1, 2014  
INVENTOR(S) : Daniel Berg Page 1 of 1

It is certified that error appears in the above-identified patent and that said Letters Patent is hereby corrected as shown below:

THE TITLE PAGE

Item (73) Assignee: Delete "Whitewater" and substitute therefore -- Wauwatosa --.

IN THE CLAIMS

Claim 7, column 12, line 8, after "of" insert -- : --.

Signed and Sealed this
Sixteenth Day of September, 2014

Michelle K. Lee
*Deputy Director of the United States Patent and Trademark Office*